Figure 1:
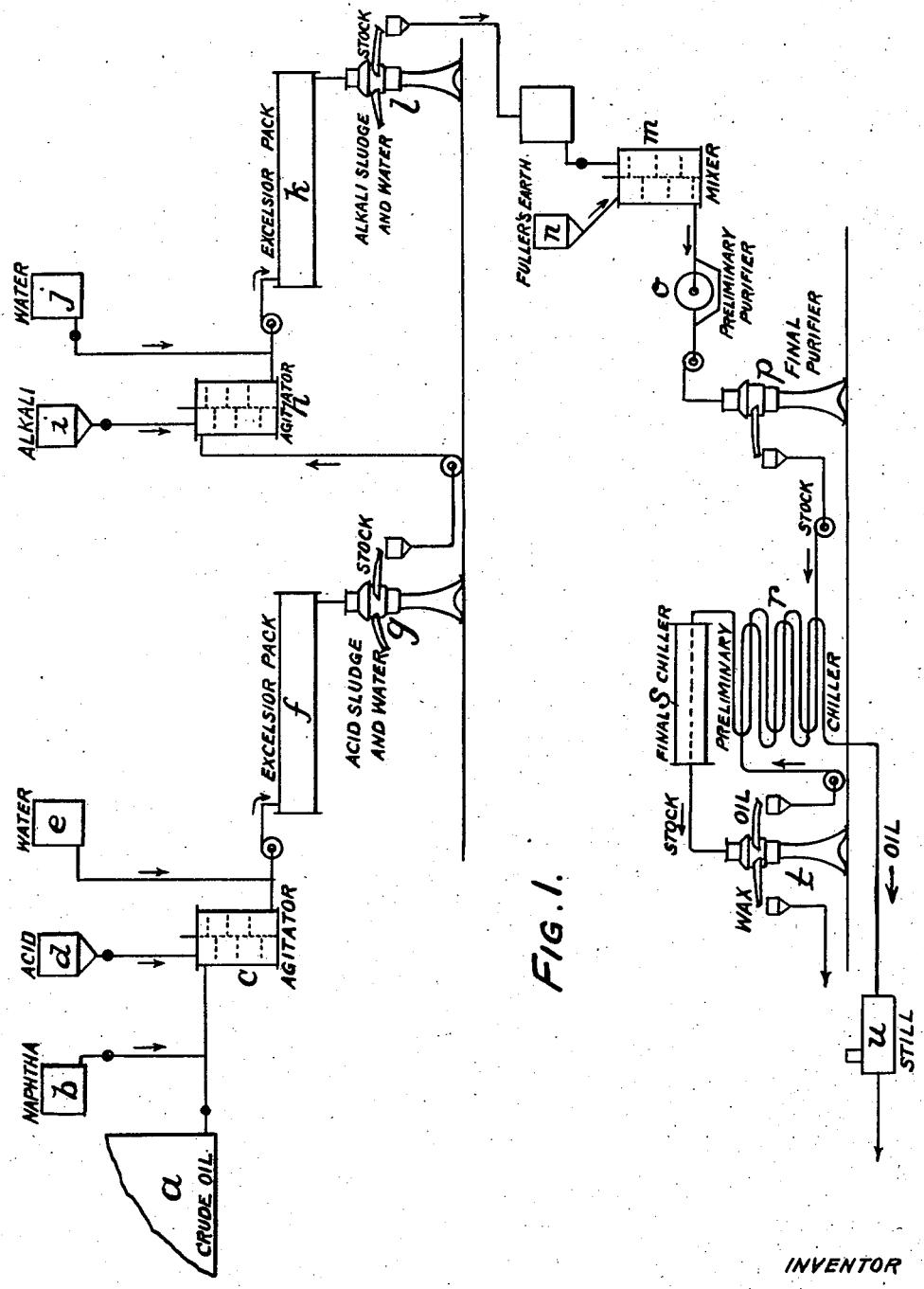

Nov. 3, 1925. 1,559,982
E. PETTY
PROCESS OF PRODUCING WAX FREE PRODUCTS FROM CRUDE PETROLEUM
Filed July 11, 1923 2 Sheets-Sheet 2

WITNESS:

INVENTOR
Earl Petty
BY
ATTORNEY.

Patented Nov. 3, 1925.

1,559,982

UNITED STATES PATENT OFFICE.

EARL PETTY, OF WINFIELD, KANSAS, ASSIGNOR TO THE DE LAVAL SEPARATOR COMPANY, OF NEW YORK, N. Y., A CORPORATION OF NEW JERSEY.

PROCESS OF PRODUCING WAX-FREE PRODUCTS FROM CRUDE PETROLEUM.

Application filed July 11, 1923. Serial No. 650,782.

*To all whom it may concern:*

Be it known that I, EARL PETTY, a citizen of the United States, residing at Winfield, county of Cowley, and State of Kansas, have invented a new and useful Improvement in Processes of Producing Wax-Free Products from Crude Petroleum, of which the following is a full, clear, and exact description, reference being had to the accompanying drawings, which form a part of this specification.

In the refining of the crude oils known as paraffin base crude oils, it is customary to distill off successively products of successively higher boiling points, such as naphtha, illuminating oils, gas oils and wax distillates, leaving as a residue stock known as cylinder oil stock. The wax distillates carry in solution more or less wax (or paraffin) of a crystalline form. The cylinder oil stock contains more or less wax of an amorphous form, having never been broken down by distillation. The wax distillates and cylinder oil stock are subjected to separate and different treatments to purify and decolorize and to separate out the wax content. Examples of such processes are set forth in applications for patents filed by me August 24, 1921, Serial No. 495,078 and No. 495,079.

The process embodying the present invention has for its object the simplification of known processes to produce the various marketable products heretofore produced and to obtain more nearly perfect results. The object is attained by a new order and arrangement of sub-processes and more particularly by means of a different order and arrangement of the specific steps set forth in the patent applications above specified.

The more specific object of my invention is to obtain wax-free products of various boiling points and specifically wax-free higher boiling point distillates and wax-free residual bright stock. My process involves treatment of the oil before separating the wax and the separation of the wax from the oil without previously distilling off wax distillate and preferably the separation of the wax from the crude oil before any substantial distillation, as well as the subsequent treatment of the oil so freed from wax. To recover such oil as may be carried off with the wax, my process involves also the treatment of such wax for the separation of the oil carried off therewith and the addition of such oil to a residual product resulting from distillation or to the originally separated oil. It is therefore necessary to describe herein the treatments to which the crude oil is subjected before the main separation of oil and wax and the treatments to which the wax, as well as such oil, are subjected after their original separation.

Figures 2, 3:
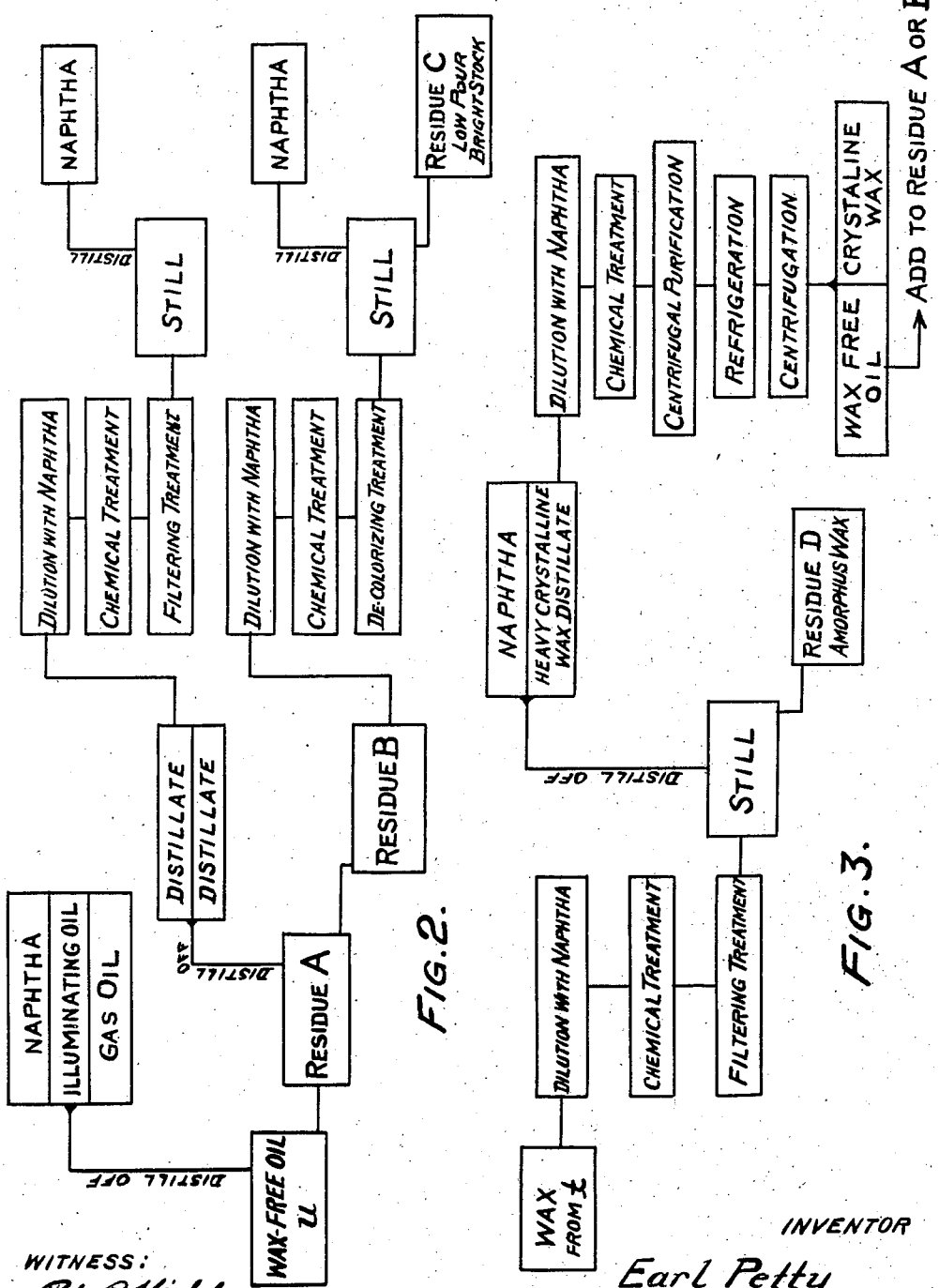

An understanding of the process may be more readily arrived at by describing the same in connection with the accompanying drawings, of which Fig. 1 is a diagram of a workable apparatus in which the first part of my process may be carried out, and Figs. 2 and 3 are diagrams of the treatments to which the originally separated oil and wax are respectively subjected.

I first add to the crude oil enough naphtha to build the oil to a 42° Bé., the crude oil supply and the naphtha supply being diagrammatically indicated at $a$ and $b$ in the drawing. The diluted stock is continuously transferred to a mechanical agitator $c$ to which is continuously supplied a small amount of sulfuric acid from an acid tank $d$. The acid-treated oil is continuously pumped, with a stream of water, from a reservoir $e$, of about one-tenth the volume of the oil, into and through a pack of excelsior $f$ and thence into a De Laval centrifugal oil separator $g$, wherein the acid sludge and acid wash water are separated from the oil. The oil from the separator is pumped continuously to a mechanical agitator $h$, to which is continuously supplied, from a tank $i$, a stream of soda ash or caustic soda. From the agitator $h$, the mixture, together with some wash water from a reservoir $j$, is pumped through an excelsior pack $k$, wherein a more thorough emulsion is effected, which emulsion continuously outflows to another centrifugal separator $l$, wherein the caustic sludge and wash water are separated from the neutralized oil. The mode of operation of the excelsior packs specified is set forth in an application filed by me August 24, 1921, Serial No. 495,080.

The thus chemically treated and partially purified oil is continuously pumped into a mechanical mixing tank $m$, to which is continuously supplied, from a supply $n$, a small proportion of fuller's earth, which is intimately mixed with the oil. From the mixer *m* the oil flows continuously into a preliminary purifier *o*, which is preferably a vacuum filter or a basket centrifuge, wherein the bulk of the fuller's earth and discoloring matter carried thereby are removed. The oil is then pumped into a De Laval centrifugal clarifier *p* wherein the oil is completely freed of the filter media and the remaining discoloring matter.

The thus chemically treated and filtered oil is then reduced to a temperature sufficient to throw the wax out of solution, say to a temperature of about 20° F. This refrigeration may be effected by running the oil through a double pipe chiller *r* in heat exchange relation with an oppositely flowing outgoing stream of cold wax-free oil and thence through a tank or tanks *s* provided with coils or shells containing refrigerated brine. The refrigerated mixture then runs into a centrifugal separator *t*, where the wax, being the heavier, is thrown to the periphery and the lighter oil displaced inwardly; wax-free oil being discharged from the light liquid outlet and wax carrying comparatively little oil from the heavy liquid outlet. The wax-free oil is then brought into heat exchange relation with the solution of oil and wax flowing toward the separator, as above described.

The wax-free crude oil is now subjected to the usual distillation (say in still *u*) for reduction to naphtha, illuminating oils, and gas oil (see Fig. 2), leaving residue A. The distillation is then continued for reduction to low pour neutral oils (spindle, light, medium, heavy, red), a low pour residue B remaining in the still.

This residue is diluted with naphtha and subjected to the same chemical and decolorizing treatments as those to which the crude oil was subjected. This treatment will be rapid. The thus purified lubricating stock is placed in steam stills or vacuum stills and carefully distilled for recovery of naphtha and reduction to finished low pour bright stock (residue C, Fig. 2).

In distilling the wax-free crude oil, as above described, after the illuminating oil has been distilled off, leaving residue A, the distillation may be carried on, as above stated, to make as many separate different gravity cuts as desired (for example, of spindle, light, medium, heavy, etc.) and each of these cuts may be blended with naphtha and subjected to a chemical and filtration treatment, as diagrammed in Fig. 2, essentially the same as that which was applied to the crude stock but operating much more rapidly. Each distillate is then reduced for separation and recovery of the naphtha. The distillation for drawing off the naphtha is done preferably in vacuum stills at a very low temperature so that the color will not be impaired.

The wax (carrying comparatively little oil) separated from the crude oil, as hereinbefore described, is warmed and then treated chemically and filtered by essentially the same process as that described for treating the crude oil, as diagrammed in Fig. 3. The wax is then reduced for separation and recovery of the naphtha. The temperature is then raised to distill off the proportion of crystalline wax desired, leaving in the still a residue (D) which is more or less entirely amorphous wax. The wax distillate resulting from the above treatment corresponds in character with the products known as "wax distillates" produced by the usual process of fractional distillation of crude oil, except that the wax distillate produced by my process is much heavier in wax.

The wax distillate is treated in accordance with the process set forth in my application filed August 24, 1921, Serial No. 495,079. This process comprises dilution with naphtha, treatment with sulfuric acid, washing with water, treatment with an alkali, washing with water, removal of heavier impurities by centrifugation, and separation of the wax and oil by refrigeration and centrifugation. The wax-free oil is added to the viscous residue remaining after the distillation of the wax from the crude oil, either after all the possible distillates have been taken off (residue B), as in one described embodiment of my process, or after the illuminating oils are distilled off (residue A), as in the other described embodiment of my process.

In all the foregoing steps, the apparatus for chemical treatment and filtration is closed and vapor proof and the loss from evaporation of the added naphtha would be small.

While I have herein specified the additions of naphtha to the crude oil, it is desired to be understood that its addition is deemed unnecessary in case the specific gravity of the crude oil is as high as 42° Bé.

Where in the claims I refer to a purifying treatment, I intend to include the herein specifically described successive treatments with an acid and an alkali and filtration, whereby the oil is largely freed from impurities and more or less decolorized, although I do not intend to limit myself to the specific treatments described.

I do not herein claim the treatment to which the wax is subjected, after it is separated from the crude oil, except as a part of a more specific embodiment of my invention, this wax treatment forming a part of the process set forth and claimed in an application filed by me September 15, 1921, Serial No. 500,755, which application specifically discloses also the preferred process herein described of obtaining wax-free higher boiling point distillates and wax-free residual bright stock.

Having now fully described my invention, what I claim and desire to protect by Letters Patent is:

1. The process of treating paraffin base crude mineral oil to obtain therefrom wax-free products of various boiling points, which comprises subjecting the oil, before distillation, to successive treatments with an acid and an alkali, to filtration and to refrigeration, thereby producing a partially purified crude oil containing wax not in solution, separating the wax from the oil by centrifugal force, and distilling the wax-free oil to obtain therefrom substantially wax-free products of different boiling points.

2. The process of treating paraffin base crude mineral oil to obtain therefrom a wax-free low pour bright stock, which comprises subjecting the oil, without distilling off wax distillate, to refrigeration and centrifugal separation to separate wax from the oil, distilling the wax-free oil to obtain therefrom distillates of different boiling points, diluting the residue with a low boiling point petroleum distillate, subjecting the thus formed blended stock to successive treatments with an acid and an alkali, and distilling off the diluting distillate.

3. The process of treating paraffin base crude mineral oil to obtain therefrom a wax-free low pour bright stock, which comprises subjecting the oil, without distilling off wax distillate, to successive treatments with an acid and an alkali, and to refrigeration and centrifugal separation to separate wax from the oil, distilling the wax-free oil to obtain therefrom distillates of different boiling points, diluting the residue with a low boiling point petroleum distillate, subjecting the thus formed blended stock to successive treatments with an acid and an alkali, and distilling off the diluting distillate.

4. The process of treating paraffin base crude mineral oil to obtain therefrom wax-free higher boiling point distillates, which comprises subjecting the oil, without distilling off wax distillate, to refrigeration and centrifugal separation to separate wax from the oil, distilling the wax-free oil to obtain therefrom distillates of various boiling points, diluting higher boiling point distillates with a low boiling point petroleum distillate, subjecting the diluted distillates to successive treatments with an acid and an alkali, and distilling off the diluting distillate to produce substantially wax-free higher boiling point distillates.

5. The process of treating paraffin base crude mineral oil to obtain therefrom wax-free higher boiling point distillate, which comprises subjecting the oil, without distilling off wax distillates, to successive treatments with an acid and an alkali and to refrigeration and centrifugal separation to separate wax from the oil, distilling the wax-free oil to obtain therefrom distillates of various boiling points, diluting higher boiling point distillates with a low boiling point petroleum distillate, subjecting the diluted distillate to successive treatments with an acid and an alkali, and distilling off the diluting distillate to produce substantially wax-free higher boiling point distillates.

6. The process of treating paraffin base crude mineral oil to obtain therefrom wax-free higher boiling point distillates and low pour bright stock, which comprises subjecting the oil, without distilling off wax distillate, to refrigeration and centrifugal separation to separate wax from the oil, distilling the wax-free oil to obtain therefrom lower and higher boiling point distillates, diluting higher boiling point distillates with a low boiling point petroleum distillate, subjecting the diluted distillate to successive treatments with an acid and an alakli, diluting the residue of said distillation with a low boiling point petroleum distillate, subjecting the diluted residue to successive treatments with an acid and an alkali, and subjecting the diluted purified distillate and the diluted purified residue to separate distillations to drive off the diluting distillates.

7. The process of treating paraffin base crude oil to obtain therefrom wax-free products, which comprises subjecting the oil, without distilling off wax distillate, to refrigeration and centrifugal separation to separate from the oil wax carrying comparatively little oil, distilling the wax free oil to obtain therefrom distillates of different boiling points, distilling the wax to drive off a crystalline wax distillate, subjecting the crystalline wax distillate to refrigeration, and centrifuging the refrigerated wax to eliminate substantially all the oil carried thereby, thereby recovering, free from wax, oil that has not been separated from the wax in the first specified centrifugal treatment.

In testimony of which invention, I have hereunto set my hand, at Tulsa, on this 22 day of June, 1923.

EARL PETTY.